HENRI G. P. FORESTIER
INVENTOR

HENRI G. P. FORESTIER
INVENTOR
AGENT

HENRI G.P. FORESTIER
INVENTOR

AGENT

United States Patent Office 3,258,769
Patented June 28, 1966

3,258,769
MULTIRATE RADAR SYSTEM INCLUDING IMPROVED AUTOMATIC RATE SWITCHING MEANS
Henri G. P. Forestier, Paris, France, assignor to Compagnie Francaise Thomson-Houston, a corporation of France
Filed Jan. 13, 1964, Ser. No. 337,352
Claims priority, application France, Jan. 16, 1963, 921,574, Patent 1,358,420
11 Claims. (Cl. 343—7.5)

This invention has as its object the provision of improved radar systems which will be of especial use in range or distance measurement and tracking of very remote or/and fast-moving targets.

It is well known that difficulties are experienced in the operation of a radar system whenever the target happens to be situated at a distance such that an echo is received from it at or about the same instant that a subsequent radar signal is being transmitted. In mathematical terms, if $1/T$ is the repetition frequency of the radar signals used and $c$ the velocity of electromagnetic waves, then it is clear that the condition for a received echo to coincide in time with a transmitted signal, is that the target distance is an integral multiple of the product $\frac{1}{2}Tc$. The quantity $\frac{1}{2}Tc$ is sometimes known as the critical distance of the radar system for the pulse repetition frequency under consideration.

The difficulties encountered whenever the target distance approximates a multiple of the critical distance as just defined arise chiefly from the masking or blanking of the relatively faint echo signal by the strong transmitted pulse, interference of stray echoes from nearby obstacles, uncertainty in the action of the T–R unit (where used) during its recovery period, and the like.

To avoid those difficulties it is known to provide the radar system with means for transmitting signals at more than one different repetition frequencies, and means for manually or automatically switching from one to another of these frequencies whenever the target is approaching a distance such that the above difficulties would arise were the repetition frequency to be retained at its first value. Radar systems operating on this principle have given better performance than systems using a fixed repetition frequency. Recent experience however, especially with extremely fast-moving and remote target objects of the kinds that have come into being within the last few years and must now be reckoned with, shows that multi-rate radar systems of this general type as now available possess certain inherent deficiencies, which it is an object of this invention to correct.

Specifically it has been found that at the instant the radar transmitter in such a system is switched from one pulse repetition frequency to another, a small but significant amount of information is generally lost or destroyed, sufficient to allow a distant target moving at very high speed to be irretrievably lost or at any rate tracking may be made very troublesome. This loss of information is chiefly due to the possibility that at the instant of switching the transmitter may be triggered to emit successive pulses which follow too closely upon one another, and the receiver may miss one or more reflected signals.

It is an object of this invention to provide a multi-rate radar system of the kind described in which the switching from one pulse transmission rate to another will be effected automatically at the requisite instant with a high degree of precision and reliability, and to minimize or eliminate the liability to loss of information and possible loss of target.

The disclosure will now proceed with reference to the accompanying diagrammatic drawings, wherein.

Figure 1:
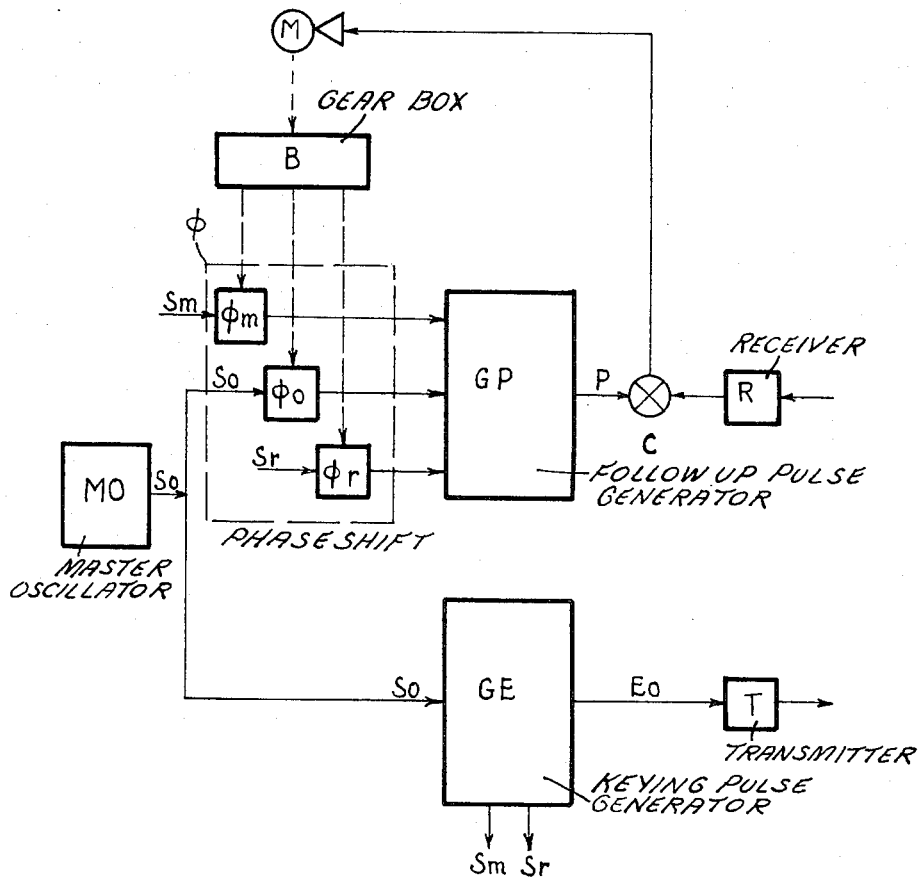
FIGURE 1 is a functional block diagram of a known form of phase-shift follow-up radar range system to which the invention is applicable with particular advantage.

Illustrated in FIGURE 1 is the general set-up of one known type of radar range system which may be termed a phase-shift follow-up system, and a general outline of which is useful as a preliminary to the detailed description of the embodiment of the invention which will follow with reference to FIGURES 2–7. It is to be understood that the invention in its broader aspects is applicable to radar systems of types other than that shown in FIGURE 1.

In the system of FIGURE 1, a master oscillator MO delivers a sine-wave voltage $So$ to a keying pulse-generator GE directly, and also to a follow-up pulse generator GP by way of a variable phase-shifting device $\phi$. Keying generator GE produces a series of keying pulses $Eo$ at a repetition frequency related to that of the sine-wave voltage $So$ and these pulses serve to key the transmission of high-power radar pulses from a radar transmitter T, which are directed at a target being pursued.

Follow-up pulse generator GP produces a series of follow-up pulses P which are similar to the keying pulses from GE except that they are phase-displaced with respect to them by a phase angle determined by the setting of phase-shifter $\phi$. These follow-up pulses are applied to one input of a time comparator device C the other input of which has applied to it the echo signals passed to it from the radar receiver R in response to echo pulses reflected or retransmitted from the target. Time comparator C produces an output whenever there is a time displacement between the signals applied to its inputs, and this error output is amplified and fed back to a tracking follow-up motor M. Motor M responds to an error signal applied to it by rotating a mechanical control of phase-shifter $\phi$ (as shown through a gear-box B) in a sense and by an amount to reduce the error signal to zero. When this condition obtains the motor M is stationary. The angular amount by which the motor (or the output shaft of gearbox B) has rotated from the position in which a follow-up pulse coincides with a keying pulse, to the position in which a follow-up pulse coincides with an echo pulse, is a measure of the target distance. To understand that this is so it is simply necessary to consider that in order to nullify the error signal from comparator C the motor M must rotate an amount proportional to the time of travel of the radar pulse to and from the target. The servo-loop including comparator C and motor M is conventional and does not per se form a part of the present invention.

Such is the fundamental operating principle of the system shown in FIGURE 1. However, as the figure shows, the actual system is somewhat more complex. The keying pulses Eo have a repetition rate that is not equal to the frequency $f_o$ of sine-wave voltage So, but is a sub-multiple $f_r = f_o/r$ of that frequency, where $r = mn$, $m$ and $n$ being integers. Keying generator GE includes means for forming two sinewave voltages Sm and Sr which are respectively at the frequencies $f_m = f_o/m$ and $f_r = f_o/r$. The phase shifter unit $\phi$ is actually composed of three phase shifters $\phi_o$, $\phi_m$ and $\phi_r$, which are respectively supplied with the sinewaves $S_o$, $S_m$ and $S_r$. The gearbox B driven from servomotor M has three output shafts which respectively control the settings of the three phase shifters and which are rotated in fixed ratios proportional to 1/1, 1/m and 1/r, so that the phase shifts imparted by the respective phase shifters $\phi_o$, $\phi_m$ and $\phi_r$ are respectively proportional to these three quantities. The follow-up pulse generator GP includes means for combining the outputs of the phase shifters to produce on output follow-up pulse train P at the same repetition rate $f_r = f_o/r$ as the repetition rate of the keying pulses Eo, and phase-displaced with respect thereto. All of the features of the conventional system which have just been described will be understood more clearly later since similar features are also applied in the embodiment of the invention selected by way of example herein and will be described in detail in connection with that embodiment and with reference to FIGURES 2–7.

Figure 2:
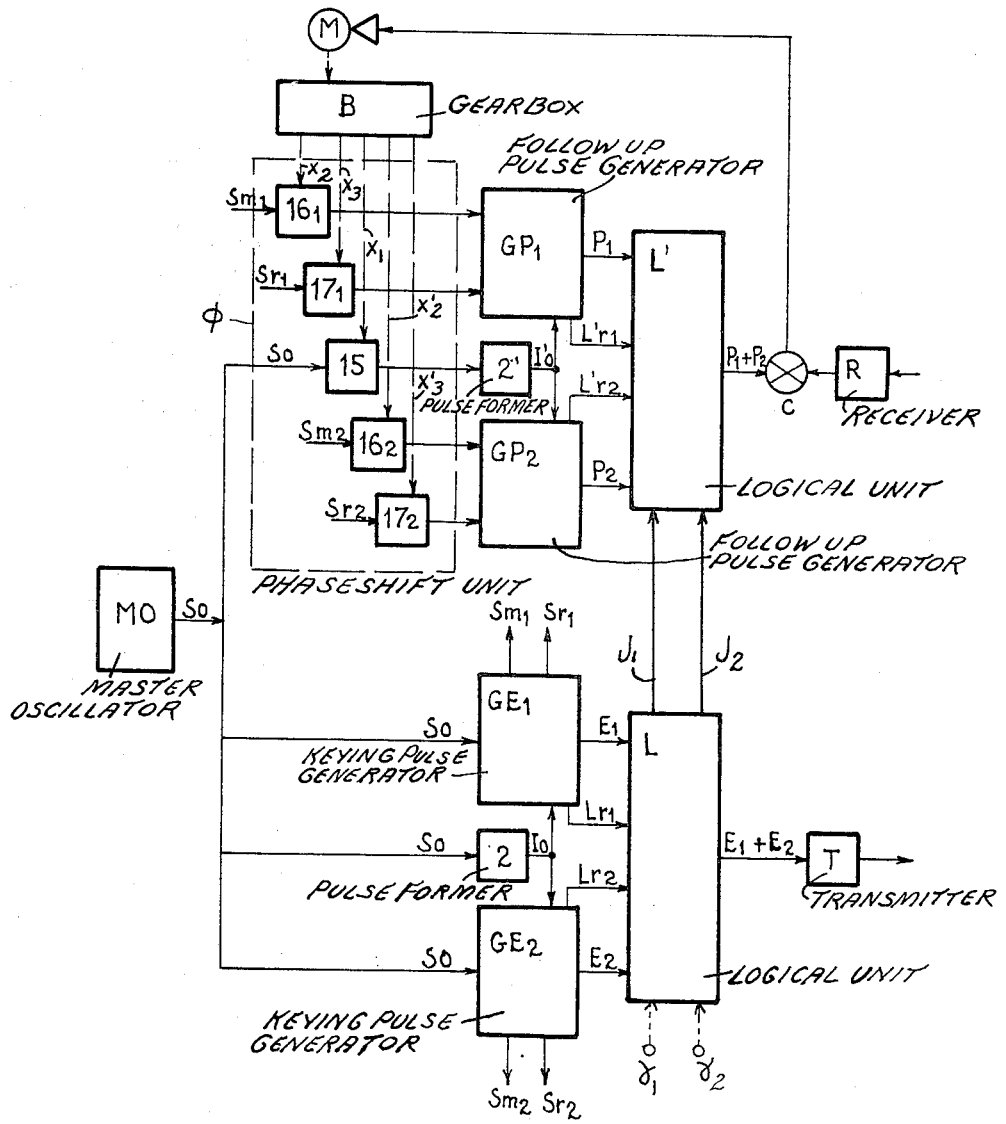
FIGURE 2 is a diagram, partly functional and partly logical, of a phase-shift follow-up radar range system of the same general type as the one shown in FIGURE 1 but embodying the improvements of the invention.

Turning now to FIGURE 2, the phase-shift follow-up radar system there shown in accordance with this invention is similar in its general principle and layout to the system of FIGURE 1. Corresponding components are designated with the same reference symbols as in FIGURE 1 with a subscript added where necessary. It will be noted that this system includes two keying pulse generators GE1 and GE2 instead of the single keying generator GE, and two follow-up pulse generators GP1 and GP2 instead of the single generator GP of FIGURE 1. The phase-shifter unit $\phi$ is here shown as including five phase shifters controlled mechanically from respective output shafts of gearbox B. The outputs of keying generators GE1 and GE2 are combined in a logical control or selector unit L to provide the final keying pulse output applied to the radar transmitter T; and the outputs of the follow-up generators GP1 and GP2 are similarly combined in a logical unit L' to provide the final follow-up pulses applied to comparator C.

Figure 3:
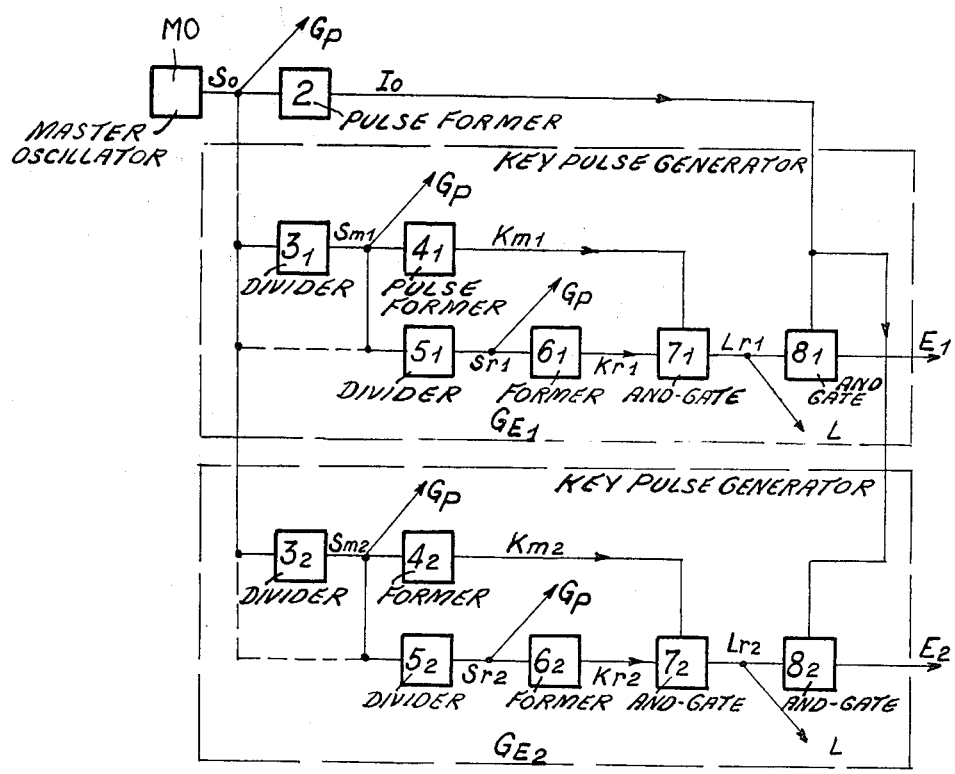
FIGURE 3 is a logical diagram of that part of the system shown in FIGURE 2 comprising the keying pulse generators GE1 and GE2.

FIGURE 3 illustrates in logical detail the structure of the pair of keying generators GE1 and GE2. As shown the sinewave output So from master oscillator MO, at at the frequency $f_o$, is applied to a pulse former 2 which converts the sinewave So into a train of narrow pulses $I_o$ at the repetition rate $f_o$ (see FIGURE 7 upper line). The sinewave So is also applied to a frequency divider $3_1$ ($3_2$) in the keying generator GE1 (GE2) so as to have its frequency divided by the factor $m_1$ ($m_2$) to produce a sinewave Sm1 (Sm2), at the frequency $f_{m1} = f_o/m1$ ($f_{m2} = f_o/m2$). The factors $m1$ and $m2$ may be equal or different. The sinewave output Sm1 (Sm2) in each generator is then applied to a pulse former $4_1$ ($4_2$) which produces a pulse train designated Km1 (Km2) at rate $f_{m1}$ ($f_{m2}$). This pulse train Km as produced in either of the two keying generators GE1 or GE2 is illustrated on the second line of FIGURE 7 with the assumption that the factor $m = 2$, for clarity.

The sinewave Sm1 (Sm2) in each generator is simultaneously applied to a further frequency divider $5_1$ and ($5_2$) in which its frequency is divided by a further integral factor $n1$ ($n2$) to produce a sinewave Sr1 (Sr2) at frequency $f_{r1} = f_{m1}/n1$ ($f_{r2} = f_{m2}/n2$). The sinewave Sr1 (Sr2) is then passed through a pulse former $6_1$ ($6_2$) which converts it into a pulse train designated Kr1 (Kr2) at the repetition frequency $f_{r1}$ ($f_{r2}$). As will be understood from the foregoing this frequency is equal to the master oscillator frequency $f_o$ divided by the factor $r1 = m1n1$ in generator GE1, and divided by factor $r2 = m2n2$ in generator GE2. If the two factors $m1$ and $m2$ are selected equal then it is necessary that $n1$ and $n2$ be unequal, and preferably incommensurable integers. All that is necessary is that $r1$ and $r2$ are unequal integers.

Figure 7:
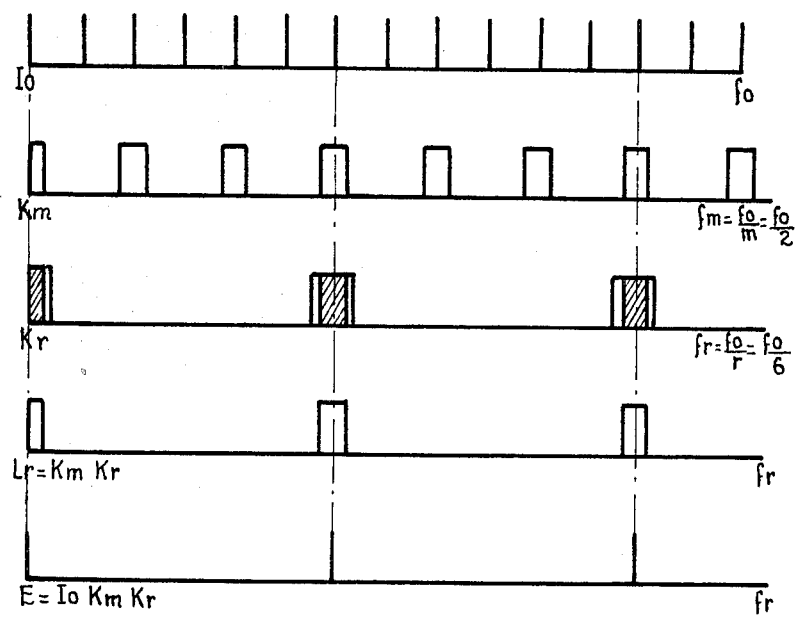
FIGURE 7 is a timing diagram for some of the pulse trains involved.

The third line in FIGURE 7 illustrates the pulse train Kr in either of the two generators, with the assumption, again for clarity, that the factor $n = 3$, and hence the factor $r = mn = 6$. It will be understood that if the pulse train Kr shown in FIGURE 7 is taken as representing say the pulse train Kr1 in generator GE1, then the corresponding pulse train Kr2 in generator GE2 should have a different suitable repetition rate, for instance with the factor $n2$ being equal to four (incommensurable with $n1 = 3$), so that said repetition rate would then be $f_{r2} = f_o/8$. In actual practice the dividing factors, here taken as two, three and four for clarity of the diagram in FIGURE 7, would usually be larger numbers.

It will be noted from FIGURE 7 that the pulse trains Km and Kr preferably have pulse widths larger than the width of the narrow initial pulses Io, though less than the spacing between these last pulses. It will also be noted that the time relationship between the three pulse trains in each generator is such that each pulse of the train Kr has an overlap with a pulse of the train Km, and further that whenever there is a coincidence between a Km and a Kr pulse, a narrow Io pulse occurs substantially at the centre of the period of overlap between said Km and Kr pulses. Such relative timing can easily be obtained, e.g. through the provision of suitable time delay networks associated with the pulse formers.

In each keying generator the pules trains Km1 and Kr1 (Km2 and Kr2) are now combined by means of a coincidence or "and"-gate $7_1$ ($7_2$) to provide the train of coincidence pulses designated Lr1 (Lr2), as illustrated on the fourth line in FIGURE 7. Further the pulse train Lr1 (Lr2) is combined with the initial pulse train Io in a further "and"-gate $8_1$ ($8_2$) to provide the train of coincidence pulses designated E1 and E2 and constituting the output pulse trains from the respective keying generators GE1 and GE2 (cf. bottom line in FIGURE 7). It will be noted that the accuracy of time-definition of the output pulse trains E1 and E2 is determined by the accuracy of definition of the initial Io to pulses.

It will also be noted that the final result of the keying generator system just described is to produce two keying pulse trains E1 and E2 at repetition frequencies so related with one another that pulses in the respective trains intermittently coincide.

It should be understood at this point that in the operation of the radar system described, only the output pulse train E1 or the train E2 is at any given time used as the train of keying pulses applied to transmitter T, selection between the two trains being effected according to the invention by means of the logical selector network L later described, in dependency on the instantaneous target distance and other considerations that will be made clear in due course.

Figure 5:
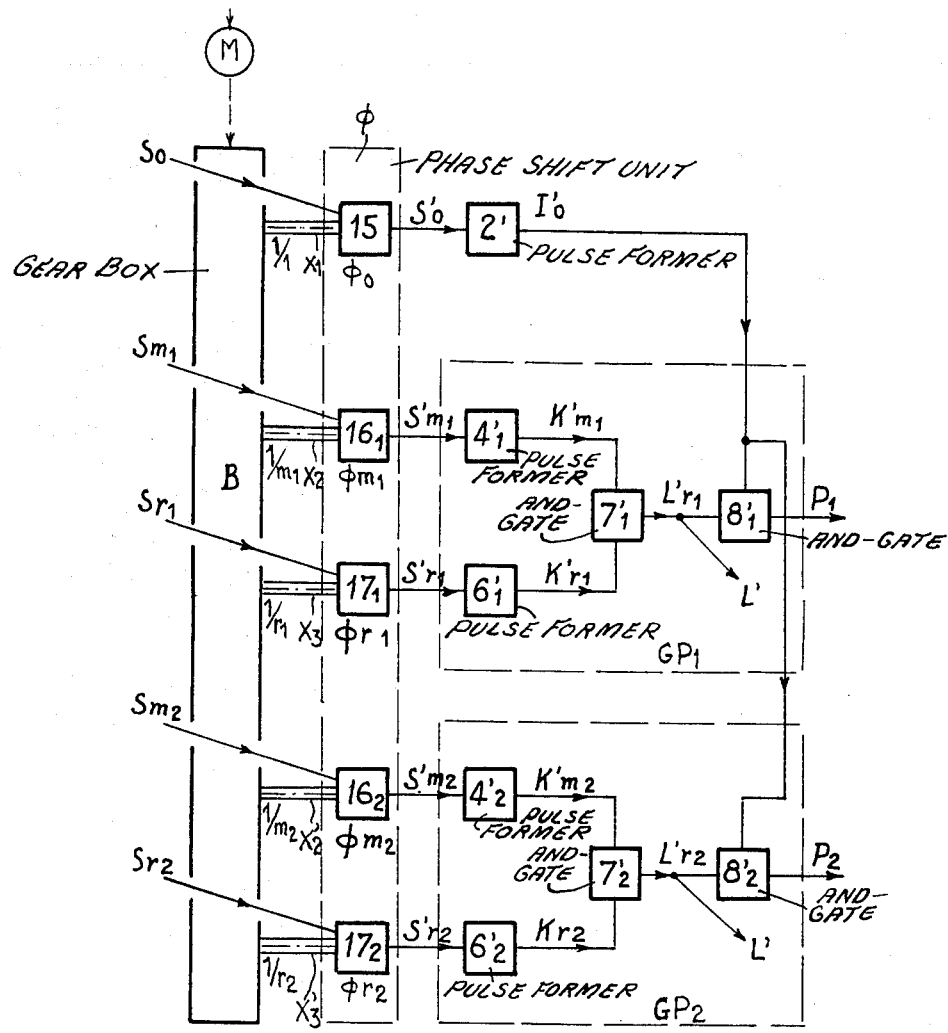
FIGURE 5 is a logical diagram of that part of the system of FIGURE 2 comprising the follow-up pulse generators designated GP1 and GP2 therein and related components.
Figure 6:
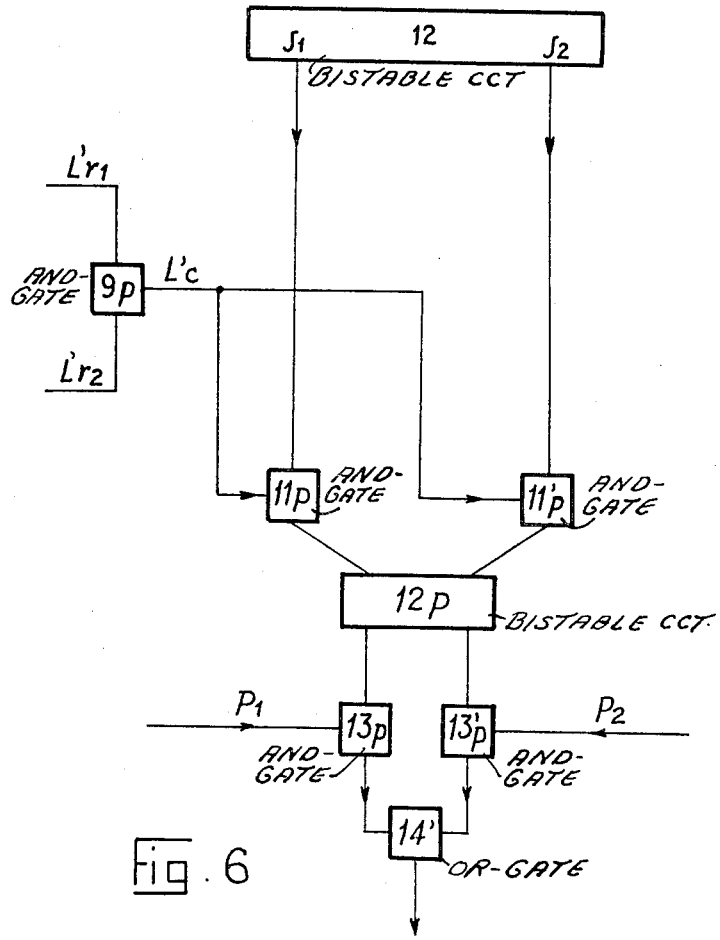
FIGURE 6 is a logical diagram of that part of the system of FIGURE 2 comprising the logical selector or control network designated L' therein.

Turning now to the construction of the follow-up section of the radar system, illustrated in detail in FIGURE 5, it will be seen that the sinewave output So from master oscillator MO is applied to a first phase shifter 15 of the phase shifter unit $\phi$ to provide a sinewave S'o at the same frequency $f_o$ as that of sinewave So but phase shifted with respect thereto by an amount determined by the mechanical setting of shifter 15. This setting is controlled by means of a first output shaft X1 of gearbox B in accordance with the operation of follow-up motor M as earlier described with reference to FIGURE 1. The sinewave S'o is passed through a pulse former 2' which converts it into a narrow pulse train I'o similar to pulse train Io but phase displaced with respect to it.

Phase-shifter unit $\phi$ includes four further phase shifters, $16_1$, $17_1$, $16_2$ and $17_2$. The phase shifters $16_1$ and $17_1$ have applied thereto the sinewaves $Sm1$ and $Sr1$ respectively, generated in keying generator GE1; and the phase shifters $16_2$ and $17_2$ have applied thereto the corresponding sinewaves $Sm2$ and $Sr2$ respectively, generated in keying generator GE2. The settings of the four phase shifters are controlled by means of respective output shafts of gearbox B, so geared that their rates of rotation are in the same proportion to the rate of rotation of the first mentioned output shaft X1 as are the frequencies of the respective sinewaves applied to the phase shifters controlled by those shafts, to the initial or master frequency $f_o$. In other words, if the rate of rotation of output shaft X1 is taken as unity, the four output shafts controlling the phase shifters $16_1$, $17_1$, $16_2$ and $17_2$ are geared to rotate at the rates $1/m1$, $1/r1$, $1/m2$ and $1/r2$ respectively. With this arrangement, it will be seen that the five phase shifters 15, $16_1$, $17_1$, $16_2$, $17_2$ will produce output sinewaves $S'o$, $S'm1$, $S'r1$, $S'm2$, $S'r2$, which are all phase shifted with respect to their corresponding input sinewaves $So$, $Sm1$, $Sr1$, $Sm2$, $Sr2$ by a common time lag or angle $t = \alpha/2\pi f_o$, where $\alpha$ (in radians) is the angular rotation of the first output shaft X1 as counted from an initial position, such that the phase conditions of the pulse trains in the respective sets ($So$, $Sm1$, . . .) and ($S'o$, $S'm1$, . . .) coincide.

In each of the two follow-up pulse generators GP1 (GP2), the sinewaves $S'm1$ and $S'r1$ ($S'm2$ and $S'r2$) are applied to respective pulse formers $4'_1$ and $6'_1$ ($4'_2$ and $6'_2$) to produce respective pulse trains $K'm1$ and $K'r1$ ($K'm2$ and $K'r2$) which are then combined in an and-gate $7'_1$ ($7'_2$) to produce the coincidence pulse train $L'r1$ ($L'r2$). This in turn is combined with the fine pulse train $I'o$ in an and-gate $8'_1$ ($8'_2$) to produce the output pulse train P1 (P2) of the follow-up generator GP1 (GP2). It will be immediately apparent that the various pulse trains just mentioned as being produced in the follow-up generators GP1 and GP2 are identical in character with the corresponding pulse trains previously described as being produced in the keying generators GE1 and GE2 and shown in FIGURE 7, except that all these follow-up generator pulse trains are delayed with respect to their corresponding keying generator pulse trains by a common time lag $t$ as explained above.

Referring to FIGURE 2, the output P1 of follow-up generator GP1, or the output P2 of GP2, is selected by means of a logical selector network L' according to the invention as will be described further on. Assuming that at a given time the keying pulses applied to transmitter T are the pulses E1 and the follow-up pulses applied to comparator C are the pulses P1 consider an initial condition in which the follow-up pulses P1 are in time coincidence with the keying pulses E1. Comparator C delivers an error signal which by way of motor M and gearbox B rotates all of the phase shifters of phase shift unit $\phi$ so that the follow-up pulses P1 are gradually retarded until they fall into coincidence with the received echo pulses from receiver R, whereupon the error signal from C becomes zero and motor M stops. The total delay that has had to be imparted to the pulses P1 to reach this condition is proportional to the target distance as earlier explained. Moreover, this total delay is given by the expression $t = \alpha/2\pi f_o$, as earlier indicated, where $\alpha$ is the angle of rotation of output shaft X1 from its initial to its final position. This can be written $t = k\alpha$ where $k$ is the constant $1/2\pi f_o$. The angle $\alpha$ may be significantly greater than $2\pi$ radians.

The rotational angle of shaft X1 can be measured on a dial or the like, calibrated in units target distance. For adequate precision in the readings, it is necessary that the angular rotation of shaft X1 per unit target distance should be comparatively large, say one full revolution per kilometer target distance. Such a large ratio of shaft rotation per increment of target distance, while necessary to afford high sensitivity, will however introduce ambiguity into the readings. It is to eliminate this ambiguity that the slower-velocity gearbox output shafts such as X2 and X3, together with the associated phase shifters and low-rate pulse train producing circuitry as described above, are provided. It will be easily understood that with a proper selection of the reduction factors such as $m1$ and $r1$, a combined reading of the angles by which the shafts X1, X2 and X3 have simultaneously revolved will provide an accurate practically unambiguous indication of the target distance.

Figure 4:
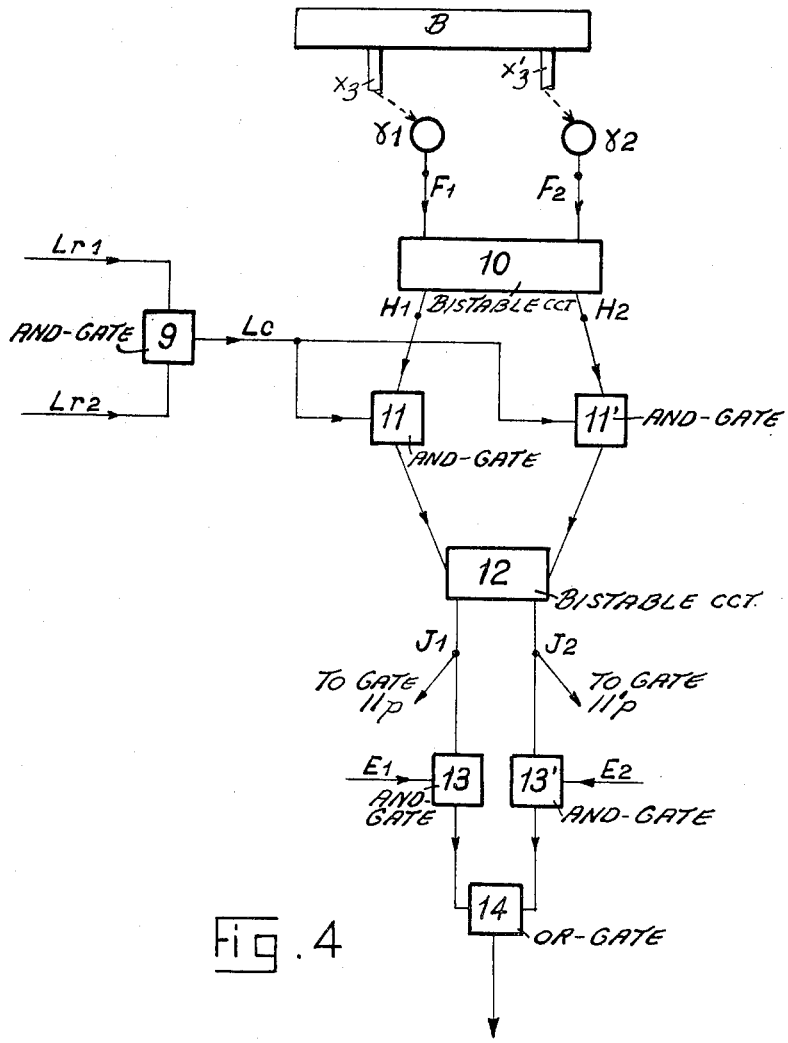
FIGURE 4 is a logical diagram of that part of the system shown in FIGURE 2 comprising the logical selector or control network designated L therein.

The selector unit L shown in detail in FIGURE 4 has the function of automatically switching the keying input of transmitter T between the output E1 of keying generator GE1 and the output E2 of keying generator GE2, according as the instantaneous distance of the target, as sensed by the system, is such that the measurement if performed in the absence of such switching would be unreliable owing to the fact that said target distance approaches a multiple of the critical distance associated with the repetition rate of the keying pulses being used. The selector unit L has the further function of so selecting the precise instant at which the switching action effectively occurs, that there is substantial coincidence at that instant between an output pulse E1 and an output pulse E2 of the two keying generators, thereby ensuring that the switching action is performed without any loss of information, as would be the case were the first pulse effective after switching to succeed hard upon the last pulse effective before switching. Such loss of information has heretofore led to disturbance in transmission, sometimes even resulting in transmitter breakdown especially in the case of modulators using thyratrons and pulse forming networks.

As earlier explained, the critical distance for keying generator GE1 is $dc_1 = \frac{1}{2} T1 c$, where T1 is the time interval between successive keying pulses E1 of the generator and $c$ the velocity of light. Similarly the critical distance for keying generator GE2 is $dc_2 = \frac{1}{2} T2 c$. An unreliable condition exists in respect to keying generator GE1 whenever the target distance approaches a multiple of the value $dc_1$ to within less than predetermined small amounts ($+\epsilon 1$, $-\epsilon 1$) by excess or by default. This condition is sensed by a cam $\gamma 1$ (see FIGURE 4) rotated by the shaft X3 of the gearbox B, and arranged to generate an electric signal F1, as by closing a switch, in response to such condition. Similarly another cam $\gamma 2$ rotated by shaft X'3 generates an electric signal F2 whenever the target approaches to within predetermined amounts ($+\epsilon 2$, $-\epsilon 2$) a multiple of the critical distance $dc_2$ for keying generator GE2 by excess or by default. The signals F1 and F2 are applied to the respective inputs of a bistable (flip flop) circuit 10. Application of an input signal F1 to bistable circuit 10 causes an output signal to appear at H2 therefrom, and application of an input signal F2 causes an output signal to appear at H1. Either output signal persists so long as the proper input signal is not applied to switch the circuit 10 to its reverse stable condition.

The output signals H1 and H2 are applied to first inputs of a respective pair of "and"-gates 11 and 11'. These gates have second inputs which both receive the output signal, $Lc$, of an "and"-gate 9 which receives at its two inputs the pulses $Lr1$ and $Lr2$ previously described as being produced in the keying generators GE1 and GE2 (see FIGURE 3 and also FIGURE 7). The outputs from and-gates 11 and 11' are applied to the respective inputs of a bistable circuit 12. Bistable circuit 12 is switched from a condition in which it emits an output signal J1 to a condition in which it emits an output signal J2 on receiving an input signal from gate 11', and vice versa. Whenever the bistable circuit 12 switches from one to the other of its conditions, this is an indication that the keying input to the transmitter T should be switched from the output of one keying generator to the output of the other as will presently become clear. The output J1 from bistable circuit 12 is applied to one input of an and-gate 13 receiving the keying pulses E1 from generator GE1 at its other input, and the output J2 is similarly applied to one input of an and-gate 13' receiving the keying pulses E2 at its other input. The outputs from both and-gates 13 and 13' are applied to the respective inputs of an "or"-gate 14. The output of or-gate 14 constitutes the output of logical unit L and is applied to the keying input of transmitter T. As shown, the J1 and J2 outputs from bistable circuit 12 are also applied to certain gates 11p and 11'p of the logic unit L' for reasons later described.

The logical unit L just described operates as follows. Assume that at a given time the target is situated at a distance that does not lie within the critical range of either one of the two keying generators as these ranges have been defined above. Assume also that bistable circuit 10 is producing a signal from its H1 output as a result of the prior operation of the system. "And"-gate 11 produces an output signal whenever the pulses Lr1 and Lr2 in both keying generators coincide, while and-gate 11' produces no ouput. Bistable circuit 12 is producing a continuous output signal at J1, so that and-gate 13 passes the whole series of keying signals E1 from generator GE1 and or-gate 14 applies these signals to the transmitter. Now assume that the target distance enters the critical range for the keying generator GE1 which is operative at this time. Cam γ1 is actuated to produce a signal F1, switching bistable circuit 10 to its reverse condition in which output signal H1 is cut off and output signal H2 turned on. The output from and-gate 11 is cut off and the output from and-gate 11' is turned on. At the next occurrence of a coincidence between Lr1 and Lr2 pulses bistable circuit 12 is switched and its output J1 cut off, while its output J2 is turned on. And-gate 13 no longer passes the E1 pulses, but and-gate 13' now passes the E2 pulses from keying generator GE2 and these pulses are passed through or-gate 14 to the keying input of the transmitter. Thus the desired switching action is automatically effected.

It can easily be seen that under the conditions assumed at the beginning of the preceding paragraph, if the target had entered the critical range for keying generator GE2, inoperative at that time, rather than entering the critical range for GE1, then no switching action would have occurred since the bistable circuit 12 would have retained its current condition.

If on the other hand the initial conditions were the reverse from these assumed above, that is, with the target situated within neither of the two critical ranges but with bistable circuit 10 producing a signal from its H2 output, so that the operative keying pulses are E2 rather than E1, then a similar discussion shows that entry of the target into the critical range for generator GE1 would produce no change in operation, while entry of the target into the critical range for generator GE2 would cut off the pulses E2 from the transmitter keying input, and cut in the keying pulses E1 instead.

The logical unit L' selecting between the follow-up pulses P1 and P2 is analogous in function and largely similar in operation and construction to the logical unit L. Specifically its function is to switch the input to comparator C from one to the other of the follow-up pulse trains P1, P2 whenever the logical unit L has effected a corresponding switch between the keying pulse trains E1, E2; and moreover, select the precise instant at which it actually performs such switching so as to avoid loss of information as through partial overlap of the follow-up pulse intervals. As will be seen from FIGURE 6, logical unit L' includes a majority of components similar to those of the logical unit L, and these components have been designated by the same references as in FIGURE 4 followed by subscript p. However, unit L' lacks components that would correspond to bistable circuit 10 and its actuating cams γ1 and γ2. Instead, the and-gates 11p and 11' p have inputs supplied with the outputs J1 and J2 respectively from the bistable circuit 12 of the logical unit L (FIGURE 4). This ensures that the switching between the follow-up generators GP1 and GP2 will occur whenever a switching between the keying generators GE1 and GE2 has occurred, and in the proper sense, but with a certain lag thereover, as determined by the time lag of a coincidence between L'r1 and L'r2 over a coincidence between Lr1 and Lr2. Thus the receiver will continue receiving any echo signals corresponding to radar pulses transmitted just prior to the switching of the keying generators, and which would otherwise not reach the receiver in time before the said switching.

It will be apparent from the foregoing that the invention has provided an improved multi-rate radar system having means for switching automatically from one signal repetition rate to another whenever a target has penetrated a critical range of distances in which continued radar operation at the former rate would be unreliable; and in which, moreover, such switching is performed automatically in such a manner as to preclude the possibility of any loss of information during the switching period both at transmission and at reception, since the actual switching is effected only at an instant where there is substantial coincidence between a pulse of the old series and a pulse of the new series. These improvements will render radar systems constructed according to the invention especially well-suited for the pursuit tracking and surveillance of target objects flying at extremely high speeds and great distances, and specifically for ranges in excess of these corresponding to the pulse repetition frequency effectively used.

It should at the same time be evident that the single embodiment of the invention shown and described is illustrative only, and that various modifications may be made in the details of the logical circuitry shown as well as in the general lay-out of the radar system without exceeding the scope of the invention.

Thus, while the system described embodies only two different repetition rates between which the keying (and follow-up) pulses are switchable, three or more different rates could obviously be used. While two frequency-dividing steps have been disclosed in order to develop the two reduced-rate pulse trains called Km and Kr in FIGURE 7, more than two such stages might be used; or only a single frequency dividing step might instead be employed, a modification indicated in FIGURE 3 by the dashed-line connections from master oscillator MO to the lower dividers 5₁ and 5₂. The alterations that would have to be made to the disclosed system to cater for any modifications such as these will be immediately apparent to the average radar engineer.

It is equally obvious that the invention is applicable to radar systems of types other than the phase-shift follow-up pulse type shown, although this does constitute a currently preferred embodiment of the invention. It is in fact evident that if the follow-up pulse generators such as GP1 and GP2 and associated components were omitted, an improved and operative radar system would still be provided, in which the automatic, time-controlled selective switching between keying pulse trains of different frequencies, by means of logical selector unit L or equivalent device according to the invention, would still have considerable advantages over the present state of the art.

What I claim is:

1. A radar system comprising radar transmitting and receiving means, the transmitting means including means generating keying pulse trains at each of at least two different repetition frequencies, and a radar transmitter keyable by the application of any one of said trains to a keying input thereof so as to transmit radar pulses at a corresponding repetition frequency, said frequencies being so selected in relation to one another that pulses in the respective trains intermittently coincide, means for commanding a change-over from one to another of said frequencies, and logic means responsive to the occurrence of a coincidence between pulses in the keying pulse trains at said respective frequencies following a change-over command for switching off the keying pulse train at said one frequency from the keying input of the transmitter and switching-on the keying pulse train at said other frequency instead.

2. The system defined in claim 1, wherein the receiving means includes means for generating tracking follow-up pulses at each of said repetition frequencies, means for variably phase shifting said follow-up pulses, servo means for varying the amount of phase shift until the phase-shifted follow-up pulses substantially coincide with received radar echo pulses, said servo means including a time comparator having an input adapted to have any one of said follow-up pulse trains applied thereto for time comparison with said received echo pulses, and further logic means responsive to the occurrence of a coincidence between pulses in the follow-up pulse trains at said respective frequencies following a change-over command for switching off the follow-up pulse train at said one frequency from said comparator input and switching-on the follow-up pulse train at said other frequency instead.

3. The system defined in claim 2, including means for delaying the switching of the follow-up pulse trains for more than a predetermined time after the switching of said keying pulse trains has been effected.

4. The system defined in claim 2, including a master oscillator and frequency-dividing means for deriving said keying pulse trains from the master oscillator output, and wherein the servo means comprises a tracking servo-motor energized from the output of said time comparator and a gearbox having an input shaft driven by said motor and having output shafts geared for rotation at gear rates respectively proportional to unity and to the reciprocal of each of the divisor factors applied in said frequency division steps, said output shafts operating respective phase shifters for imparting phase shifts proportional to said gear rates to the output pulse train of the master oscillator and to each of a plurality of pulse trains at respective repetition frequencies resulting from said division steps, and the phase shifted pulse trains are recombined to provide said phase-shifted tracking follow-up pulse trains.

5. The system defined in claim 1, including a common master oscillator and frequency-dividing means for deriving all said pulse trains from the output of said master oscillator.

6. A radar system comprising radar transmitting and receiving means, the transmitting means including means generating keying pulse trains at each of at least two different repetition frequencies, and a radar transmitter keyable by the application of any one of said trains to a keying input thereof so as to transmit radar pulses at a corresponding repetition frequency, said frequencies being so selected in relation to one another that pulses in the respective trains intermittently coincide, means responsive to the entry of a target into a critical range of distances relating to the current keying repetition frequency for emitting a frequency change-over command signal, and logic means responsive to the occurrence of a coincidence between pulses in the keying pulse trains at said respective frequencies following a change-over command signal for switching off the keying pulse train at said one frequency from the keying input of the transmitter and switching on the keying pulse train at said other frequency instead.

7. The system defined in claim 6, wherein said change-over command producing means includes cams operated by said receiving means.

8. The system defined in claim 6, wherein the receiving means includes means for generating tracking follow-up pulses at each of said repetition frequencies, means for variably phase shifting said follow-up pulses, servo means for varying the amount of phase shift until the phase-shifted follow-up pulses substantially coincide with received radar echo pulses, said servo means including a time comparator having an input adapted to have any one of said follow-up pulse trains applied thereto for time comparison with said received echo pulses, and further logic means responsive to the occurrence of a coincidence between pulses in the follow-up pulse trains at said respective frequencies following a change-over command for switching off the follow-up pulse train at said one frequency from said comparator input and switching-on the follow-up pulse train at said other frequency instead.

9. The system claimed in claim 8, wherein said frequencies are two in number, and including means operated by said servo means to emit a frequency change-over command signal whenever the target enters a critical range of distances relating to the current keying repetition frequency, and said logic means includes a bistable element having respective inputs to which said change-over command signals are applied for changing the condition of said bistable element so as to produce one of two respective outputs therefrom.

10. The system defined in claim 9, wherein said logic means further includes two logical-and circuits having said outputs of said bistable element applied to first inputs thereof and a signal indicative of substantial coincidence between said keying pulse trains applied to second inputs thereof, a further bistable element having the outputs of said and-circuits applied to respective inputs thereof and producing two outputs in its respective stable conditions, a pair of further and-circuits having the outputs of the further bistable element applied to first inputs thereof and having the respective keying pulse trains applied to second inputs thereof, and a logical-or circuit having the outputs of said last and-circuits applied to respective inputs thereof, the output of said or-circuit being applied to the transmitter keying input.

11. The system defined in claim 10, wherein said further logic means comprises two logical-and circuits having the outputs of said further bistable element applied to first inputs thereof and having a signal indicative of substantial coincidence between pulses in the follow-up pulse trains applied to second inputs thereof, another bistable element having the outputs of said last and-circuits applied to respective inputs thereof and producing two outputs in its respective stable conditions, a pair of further and-circuits having the outputs of said other bistable element applied to first inputs thereof and having the respective follow-up pulse trains applied to second inputs thereof, and a logical-or circuit having the outputs of said last and-circuits applied to respective inputs thereof, the output of said or-circuit being applied to said time comparator input.

References Cited by the Examiner

UNITED STATES PATENTS 3,155,973   11/1964   Smith _____ 343—7.3 X

CHESTER L. JUSTUS, *Primary Examiner.*

T. H. TUBBESING, *Assistant Examiner.*